(12) United States Patent
Hsu

(10) Patent No.: US 6,260,511 B1
(45) Date of Patent: Jul. 17, 2001

(54) PROCESS FOR THE PREPARATION OF ABSORBENT MATERIALS

(75) Inventor: Jay C. Hsu, West Chester, PA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 493 days.

(21) Appl. No.: 08/590,580

(22) Filed: Jan. 24, 1996

(51) Int. Cl.$^7$ .................................................. A01K 1/015
(52) U.S. Cl. ........................................... 119/172; 119/171
(58) Field of Search ..................... 119/171, 172, 119/173; 502/400, 401

(56) References Cited

U.S. PATENT DOCUMENTS

| 4,203,388 | 5/1980 | Cortigene et al. ................ 119/1 |
|---|---|---|
| 4,263,873 | 4/1981 | Christianson ..................... 119/1 |
| 4,303,019 | 12/1981 | Haataja et al. ................ 108/51.1 |
| 4,305,345 | 12/1981 | Otoguro ............................ 119/1 |
| 4,311,115 | 1/1982 | Litzinger .......................... 119/1 |
| 4,341,180 | 7/1982 | Cortigene et al. ................ 119/1 |
| 4,374,794 | 2/1983 | Kok ................................. 264/122 |
| 4,409,925 | 10/1983 | Brundrett et al. ................ 119/1 |
| 4,458,629 | 7/1984 | Gerber ............................. 119/1 |
| 4,560,527 | 12/1985 | Harke et al. .................... 264/500 |
| 4,619,862 | 10/1986 | Sokolowski et al. ............ 428/221 |
| 4,621,011 | 11/1986 | Fleischer et al. ............... 428/221 |
| 4,625,679 | 12/1986 | Hill ................................... 119/1 |
| 4,721,059 | 1/1988 | Lowe et al. ...................... 119/1 |
| 4,723,509 | 2/1988 | Schaefer .......................... 119/1 |
| 4,734,393 | 3/1988 | Lowe et al. .................... 502/404 |
| 4,975,108 | 12/1990 | Pruitt .............................. 71/23 |
| 5,085,175 | * 2/1992 | Clements, Jr. et al. ......... 119/171 |
| 5,094,604 | 3/1992 | Chavez et al. ................. 425/222 |
| 5,100,600 | 3/1992 | Keller et al. .................... 264/112 |
| 5,195,465 | 3/1993 | Webb et al. .................... 119/172 |
| 5,209,186 | 5/1993 | Dewing ........................... 119/172 |
| 5,215,041 | 6/1993 | Krahenbuhl ..................... 119/172 |
| 5,323,791 | * 6/1994 | Wu et al. ........................ 131/369 |
| 5,339,769 | * 8/1994 | Toth et al. ...................... 119/173 |
| 5,429,741 | 7/1995 | Webb et al. .................... 210/242.4 |
| 5,614,458 | * 3/1997 | Webb et al. .................... 119/171 |
| 5,622,600 | 4/1997 | Smith et al. .................... 162/190 |
| 5,648,306 | * 7/1997 | Hahn et al. ..................... 119/172 |

FOREIGN PATENT DOCUMENTS

| 0039522A2 | 11/1981 | (EP) . |  |
|---|---|---|---|
| 0115898A1 | 8/1984 | (EP) . |  |
| 0751253A2 | 1/1997 | (EP) . |  |
| 2244059 | * 11/1991 | (GB) ............................. 119/173 |
| 95/07384 | 3/1995 | (WO) . |  |
| 96/19284 | 6/1996 | (WO) . |  |

OTHER PUBLICATIONS

Silver and Silver Alloys to Sulfolanes and Sulfones, pp. 83–93 in *Encyclopedia of Chemical Technology*, Third Edition, vol. 21; Kirk–Othmer.

EPC Counterpart International Search Report dated Oct. 28, 1997.

*Marcal Paper Introduces Recycled, All–Purpose Absorbent*, Pulp & Paper Prospectus, p. 5, Aug. 1997.

* cited by examiner

*Primary Examiner*—Daniel J. Colilla
(74) *Attorney, Agent, or Firm*—Scott B. Garrison

(57) ABSTRACT

Methods are provided for preparing absorbent material, comprising providing non-broken down and uncut recycled fiber sludge having a moisture content of greater than about 40%; pelletizing said recycled fiber sludge to form wet pellets; and drying said wet pellets. The absorbent material is particularly useful as an industrial-grade waste liquid absorbent and/or an animal litter.

13 Claims, 2 Drawing Sheets

PROCESS FOR THE PREPARATION OF ABSORBENT MATERIALS

FIELD OF THE INVENTION

The present invention relates to processes for the preparation of absorbent materials. More particularly, the present invention relates to processes for the preparation of absorbent materials from recycled fiber sludge.

BACKGROUND OF THE INVENTION

Absorbent materials, especially granular absorbent materials, are used for a variety of industrial and household purposes. Typical uses include the absorption of liquids, such as water, oil, grease and solvents, spilled on floors and other surfaces, and as animal litters, such as cat litter.

Conventional granular liquid absorbents usually comprise naturally-occurring organic or inorganic absorbent materials, such as clay, sand, wood chips, sawdust, peanut shells, rice hulls and shredded paper, cardboard and newsprint. Animal litters comprise a special class of granular liquid absorbents and are used to collect animal waste products in households having pets, especially cats. Conventional animal litters typically comprise inert, high surface area materials, such as clay, bentonites and cellulose. Fragrances and odor-controlling agents can be added to some of these materials to improve and/or mask odors.

Conventional absorbent materials, including industrial-grade waste liquid absorbents and animal litters, are disadvantageous in that they generally have low absorbency, and suffer from dusting and disposal problems. Typical prior art absorbent materials can absorb an amount of liquid equal to or less than their own weight. Accordingly, these materials become saturated quickly and must be discarded and replaced frequently. This increases the costs associated with using industrial-grade waste liquid absorbents and animal litters. With particular reference to animal litters, there are also disposal problems since the saturated litters often cling to litter trays and pans. Conventional absorbents also possess high bulk densities, generally from about 36 to about 50 lbs/ft$^3$, which creates handling problems for consumers. Conventional litters also tend to adhere to the feet of domestic pets, resulting in the litter being scattered out of the litter box. This creates housekeeping problems. Inorganic absorbents, such as clay absorbents, are also abrasive, and can cause damage to nearby flooring.

There is an increasing need for methods of disposal of fibrous sludge from paper processing plants. In a conventional paper deinking plant, 100 dry tons of waste paper can be processed into about 65 to about 80 dry tons of recycled (reusable) fiber. The remaining 20 to 35 tons of waste paper is unusable, and becomes part of the sludge produced by the deinking plant. This unusable sludge typically contains about 50 to about 70 percent water. Thus, 100 dry tons of waste paper can produce from about 70 to about 120 wet tons of sludge requiring disposal.

Conventional methods for disposing sludge include landfill disposal, land spreading, composting and incineration. Landfill and land spreading sites are being depleted at an alarming rate, and the establishment of new sites is difficult due to environmental concerns. Composting and incineration of sludge also raises environmental concerns. Some innovative sludge disposal techniques include processing the sludge into pellets for fuel or into lightweight aggregates for construction, pyrolysis, gasification, and incorporation into cements. However, these techniques generally require the use of complex methods and expensive equipment.

The incorporation of fiber sludge into animal litters has also been reported. For example, Lowe et al., U.S. Pat. No. 4,721,059 describes animal fillers produced from the waste material obtained during paper manufacture. The methods for making the animal fillers of Lowe et al. suffer from drawbacks in that they require that dewatered fibers be broken down or shredded with a delumper, reduction mill or shredder to a fiber length of 1 to 10 mm, with a fiber length of 1 to 4 mm being preferred. Breaking down or shredding the fibers to a specific fiber length requires additional manufacturing steps and, therefore, increased manufacturing costs.

Cortigene et al., U.S. Pat. No. 4,203,388 describes an animal litter comprising pelleted and dried rejects of a secondary fiber plant. The methods for making animal litters of Cortigene et al. suffer from drawbacks in that they require that the sludge be dewatered to a water content between about 32 and 40%. Dewatering sludge to a water content of 40% and below can be difficult. Moreover, the methods disclosed in the Cortigene et al. patent require that the dewatered sludge cake be cut into small pieces, prior to pelletizing. Dewatering the sludge to a water content of 40% or less and cutting the sludge cake into small pieces requires additional manufacturing steps and, therefore, increased manufacturing costs.

Although processes have been developed for recycling fiber sludge into recycled paper products, these processes have not been widely accepted because of the difficulty associated with controlling the quality of the resulting recycled paper products.

Accordingly, new and/or better absorbent materials, including absorbent materials for use as industrial-grade waste liquid absorbents and household absorbents, such as animal litters, are needed. In addition, new and/or better methods for the use or disposal of fibrous sludge are needed. The present invention is directed to these, as well as other important ends.

SUMMARY OF THE INVENTION

The present invention is directed in part to methods for preparing absorbent materials and the absorbent materials themselves. In one embodiment, there are provided methods for preparing absorbent material which comprise providing non-broken down and uncut recycled fiber sludge having a moisture content of greater than about 40%. The sludge is pelletized to form wet pellets which are subsequently dried.

Another aspect of the present invention relates to methods for preparing absorbent material which comprise providing recycled fiber sludge having a moisture content of greater than about 50% to less than about 70%. The sludge is pelletized to form wet pellets which are subsequently dried.

Yet another aspect of the present invention relates to absorbent material which is prepared by a process comprising providing non-broken down and uncut recycled fiber sludge having a moisture content of greater than about 40%. The sludge is pelletized to form wet pellets which are subsequently dried.

Still another aspect of the present invention relates to absorbent material prepared from recycled fiber sludge. The absorbent material comprises a bulk density of less than about 36 lb/ft$^3$ and a liquid absorbing capacity of at least about 1.1.

Another aspect of the invention relates to methods of absorbing a liquid which comprise contacting the liquid with an absorbent material. The absorbent material is prepared by a process comprising providing non-broken down and uncut recycled fiber sludge having a moisture content of greater than about 40%. The sludge is pelletized to form wet pellets and the wet pellets are dried.

Highly desirable and unexpected benefits are achieved with embodiments of the present invention. In this connection, the absorbent materials of the present invention possess desirable liquid absorbing capacities. Accordingly, small quantities of the absorbent materials can be used to absorb large volumes of liquid. The desirable liquid absorbing capacity increases the cost-effectiveness of the present absorbent materials. They also do not need to be discarded and substituted with fresh absorbent materials as frequently as conventional absorbent materials. This lessens environmental concerns. In addition, the present invention utilizes recycled fiber sludge as a raw material, the disposal of which is generally included in the overhead costs of the producer. Thus, embodiments of the present invention can be employed to significantly reduce the production costs for absorbent materials.

The present absorbent materials possess low bulk densities, which permits easy handling by consumers. The methods for preparing the present absorbent materials from recycled fiber sludge are simple and involve a minimum number of process steps. Thus, additional process steps, such as extensive dewatering of the sludge, breaking down or shredding the fibers, and/or cutting dewatered sludge cakes into small pieces, which can be required in connection with the preparation from fiber sludge of prior art absorbent materials, are unnecessary with the methods of the present invention.

These and other aspects of the invention will become more apparent from the present description and claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

DETAILED DESCRIPTION OF THE INVENTION

Figure 1:
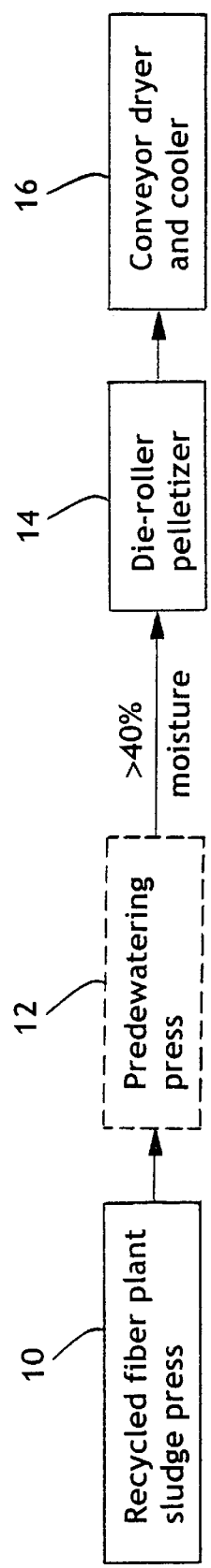
FIG. 1 is a schematic representation of an exemplary process for preparing the absorbent material according to the present invention.

As employed above and throughout the disclosure, the following terms, unless otherwise indicated, shall be understood to have the following meanings.

"Recycled fiber sludge" refers to the primary compressible waste solids discharged from a dewatering device in a plant, for example, a tissue-grade deinking mill, that processes waste paper into recycled fiber. Recycled fiber sludge is mainly composed of water, cellulose fiber, and other additives used in paper making, including, sizes, fillers, dyes, pigments, coating materials and inks. Recycled fiber sludge generally has a dark grey color when wet and a light grey color when dried.

"Non-broken down" refers to recycled fiber sludge which comprises sludge that has not been broken down or shredded, such as by a reduction mill or shredder. Non-broken down fiber sludge generally comprises sludge which can be conveyed by a mechanical conveyor and fed into a pelletizing device.

"Uncut" refers to recycled fiber sludge cake which is not cut into small pieces after being dewatered.

"Wet pellets" refers to pellets formed from recycled fiber sludge, prior to drying.

"Liquid absorbing capacity" refers to the ability of the absorbent materials described herein to absorb liquid. Liquid absorbing capacity is expressed as the weight of liquid absorbed by an absorbent material divided by the weight of the absorbent material.

The term "%" or "percent" refers to percent by weight.

The absorbent materials provided herein are highly absorbent and can be used for absorbing various liquids including non-polar liquids, for example, petroleum-based liquids, such as oil and grease, polar liquids, for example, aqueous liquids, such as water and urine, and solvents, including organic solvents. The present absorbent materials are highly useful for absorbing accidental liquid spills on surfaces, such as oil spills and solvents on floors, workbenches and driveways. The present absorbent materials are also particularly useful as an animal litter, especially cat litter, for absorbing animal urine and other waste liquids. The methods of the present invention address environmental concerns associated with the disposal of recycled fiber sludge. The methods provided herein are simple and can be performed with minimal equipment. Because of this, the preparation of the present absorbent materials can be conducted, for example, within or proximate a waste paper recycling plant. This obviates the need to transport recycled fiber sludge to a separate processing facility.

The present invention is directed, in part, to methods for the preparation of an absorbent material. The methods involve the use of recycled fiber sludge having a moisture content of greater than about 40%. Depending upon the operations being performed in a particular waste paper recycling plant, the recycled fiber sludge can also include secondary sludge. Secondary sludge is composed primarily of microbial biomass. However, due to safety and environmental considerations, the recycled fiber sludge preferably comprises substantially little or no secondary sludge.

The ash content of recycled fiber sludge is indicative of the amount of additives which are incorporated in the waste paper. The ash content of recycled fiber sludge is generally about 20 to about 80%. Waste paper containing high filler and coating materials, for example, magazines, provides recycled fiber sludge having a high ash content. Recycled fiber sludge from newsprint deinking mills generally contains a low ash content. A representative sample of ash is composed of the following materials.

| Material | % |
|---|---|
| Si as $SiO_2$ | 46.4 |
| Al as $Al_2O_3$ | 40.6 |
| Fe as $Fe_2O_3$ | 1.5 |
| Ti as $TiO_3$ | 1.5 |
| Ca as CaO | 7.4 |
| Mg as MgO | 0.9 |
| Na as $Na_2O$ | 0.3 |
| K as $K_2O$ | Nil |
| S as $SO_2$ | 0.3 |
| P as $P_2O_5$ | 0.8 |
| Ignition loss at 900° F. | 0.1 |
| Undetermined | 0.2 |
| Total | 100.0 |

A. H. Nadelman and L P Neston, *TAPPI*, Vol. 43(2), p. 120 (1960).

The ash content of the recycled fiber sludge employed in the methods of the present invention can vary and depends, for example, on the mill from which the recycled fiber sludge is obtained, the particular components incorporated in the recycled fiber sludge, and the like. In preferred embodiments, the recycled fiber sludge possesses a low ash content. This is because the ash, which is generally a measure of the concentration of inorganic materials present in the sludge, does not contribute significantly to the liquid absorbing capacity of absorbent materials prepared therefrom.

Preferably, the ash content of the recycled fiber sludge is less than about 80%, with ash contents of less than about 75% being more preferred. Even more preferably, the recycled fiber sludge has an ash content of less than about 70%, with ash contents of less than about 65% being still more preferred. Yet more preferably, the recycled fiber sludge has an ash content of less than about 60%, with ash contents of less than about 55% being even more preferred. Still more preferably, the recycled fiber sludge has an ash content of less than about 50%, for example, about 47%, with ash contents of less than about 45% being yet more preferred. Even more preferably, the recycled fiber sludge has an ash content of less than about 40%, with ash contents of less than about 35% being still more preferred. Yet more preferably, the ash content of the recycled fiber sludge is less than about 30%, with ash contents of less than about 25% being even more preferred. A particularly preferred ash content of the recycled fiber sludge is about 23%.

As noted above, the recycled fiber sludge employed in the present methods has a moisture content of greater than about 40%. As discussed in detail below, the moisture content of the recycled fiber sludge is an important factor and can affect the ease with which the sludge is processed into pellets, as well as the liquid absorbing capacities of the resulting absorbent materials. Preferably, the recycled fiber sludge has a moisture content of greater than about 40% to about 70%. More preferably, the moisture content of the sludge is from about 42% to less than about 70%, with a moisture content of from about 50% to less than about 70% being even more preferred. Still more preferably, the recycled fiber sludge has a moisture content of from about 55% to less than about 70%, with a moisture content of from about 60% to less than about 70% being yet more preferred. Especially preferred is a moisture content of from greater than about 60 to about 68%, and more preferably, from greater than about 60 to about 66%, and even more preferably about 63%.

Recycled fiber sludge typically contains from about 50 to about 70% moisture. To reduce the moisture content, the sludge can be dewatered with any suitable dewatering device, including, for example, a felt press or screw press device. Of course, the moisture content of the recycled fiber sludge can be increased by the addition of water.

After providing the recycled fiber sludge with a moisture content of at greater than about 40%, the sludge is pelletized to form wet pellets. Although it is contemplated that a wide variety of pelletizing devices are available and can be used to pelletize the sludge, it has been found that certain devices, and especially die-roller pelletizer-type devices, are preferable for this operation. The die in a die-roller pelletizer device is in the form of a metal ring. During operation, the die rotates about two or three times to compress and extrude the recycled fiber sludge. The extrusion force in a die roller pelletizing device is tangential to the die surface. Thus, although the sludge gradually forms a mat on the die surface, sludge can nevertheless be expelled continuously from the die, without plugging.

In contrast to die-roller pelletizer devices, it has been found that certain pelletizing devices, including pelletizing devices in which the extrusion force is applied in a direction other than tangential to the die surface, such as screw extruder devices, are less preferred for use in the pelletizing operation. This is because these other extruder devices have an increased tendency to become clogged. In this connection, screw extruder devices extrude the recycled fiber sludge through a flat die that has multiple holes. The extrusion force is perpendicular to the die surface in screw extruders. During operation, the sludge gradually forms a mat on the die surface which plugs the holes in the device.

Adjustable cut-off knives can be used to cut the extruded sludge into wet pellets having the desired length. Preferably, the wet pellets have a diameter of about $3/32$ inch to about $1/4$ inch, and a length of about $1/8$ inch to about $1/2$ inch. More preferably, the wet pellets have a diameter of about $1/8$ inch to about $3/16$ inch, and a length of about $3/16$ inch to about $5/16$ inch.

As noted above, the moisture content of the recycled fiber sludge can markedly effect further processing of the sludge into pellets. If the recycled fiber sludge has a high moisture content, such as about 70% or greater, water is expelled from the sludge during extrusion. This results in the formation of separate water and sludge phases. In addition, the resulting wet pellets lack structural integrity and tend to stick together prior to drying. When the moisture content of the recycled fiber sludge is less than about 70%, the expulsion of water during extrusion is substantially prevented. In addition, the structural integrity of the wet pellets is substantially improved at moisture contents below about 70%. The tendency of the wet pellets to stick together can be substantially eliminated by employing recycled fiber sludge having a moisture content of less than about 65%. However, as the moisture content of the sludge is reduced below about 42%, for example, about 40%, the malleability of the recycled fiber sludge diminishes. As a result, difficulty is encountered in extruding recycled fiber sludge having a moisture content of about 40%, and the dies of the pelletizing device have an increased tendency to clog. Accordingly, in preferred embodiments of the present invention, the moisture content of the recycled fiber sludge is greater than about 40%, for example, at least about 42%. As the moisture content falls below about 40%, repeated clogging of the dies occurs, and at moisture contents of about 25% or less, clogging is severe, requiring shutdown of the pelletizer device.

In addition to affecting pellet formation, the moisture content of the recycled fiber sludge also can have a marked impact on the liquid absorbing capacities of the resulting pellets. For example, it has been observed that pellets produced from recycled fiber sludge having a higher moisture content of, for example, greater than about 40%, such as about 42%, have improved liquid absorbing capacities relative to pellets produced from recycled fiber sludge having a lower moisture content of, for example, less than about 42%, such as about 40% or less. While the inventor does not wish to be bound by any theory of operation, the reasons that pellets produced from recycled fiber sludge having a higher moisture content possess improved liquid absorbing capacities is as follows. During drying, the moisture in the wet pellets vaporizes which creates void spaces. These void spaces are capable of entrapping liquid. Pellets produced from recycled fiber sludge having a higher moisture content have more void space as compared to pellets produced from recycled fiber sludge having a lower moisture content. Pellets having more void spaces are capable of absorbing or entrapping a greater volume of liquid.

After the wet pellets are discharged from the pelletizer device, the pellets are dried. A variety of drying techniques are available for drying the wet pellets, and such techniques would be apparent to one of ordinary skill in the art, based on the present disclosure. Preferably, the pellets are dried using a method wherein the pellets remain substantially motionless relative to each other, thereby substantially avoiding frictional movement. "Frictional movement", as used herein, refers to pellet movement wherein the pellets rub against each other or against other surfaces, such as the walls of the drying device. Frictional movement is undesirable because it can result in the erosion and/or destruction of the pellets, as well as the creation of fines and dust. In preferred embodiments, a conveyor dryer device is used to dry the wet pellets. The use of a conveyor dryer minimizes frictional movement of the pellets during the drying process, resulting in substantial elimination of the production of dust or fines. In contrast, other dryers, such as rotary dryers, can cause destruction of pellets and the creation of fines and dust and their use should be avoided.

In preferred embodiments, the wet pellets are dried to a moisture content of less than about 10%, with moisture contents of about 5% being more preferred. The desired moisture content of the dried pellets can be obtained by heating the wet pellets to between about 230° F. to about 260° F. and for a period of time of about 5 to about 10 minutes. A variety of heat sources are available for use to heat the wet pellets to a desired temperature and to dry the pellets to the desired moisture content. Suitable heat sources include, for example, steam and natural gas. After drying, the dried pellets can be cooled with ambient air.

If desired, a deodorant and/or fragrance can be incorporated into the absorbent materials. This incorporation can take place during the processing of the recycled fiber sludge, for example, after dewatering and before pelletizing, or after drying. The incorporation of a deodorant and/or fragrance can be particularly desirable with absorbent materials used as an animal litter. The particular deodorant and/or fragrance selected can vary and depends, for example, on the contemplated end use. Suitable deodorants or fragrances include, for example, cat litter deodorizers commercially available from Church & Dwight Co., Inc. (Princeton, N.J.) or baking soda.

The absorbent materials of the present invention have desirably high liquid absorbing capacities. In preferred embodiments, the present absorbent materials have a liquid absorbing capacity of at least about 1.1, with liquid absorbing capacities of greater than about 1.1, for example, about 1.2, about 1.3 or about 1.4, being more preferred. Even more preferably, the absorbent materials have a liquid absorbing capacity of at least about 1.5, with liquid absorbing capacities of at least about 1.6 being still more preferred. In a yet more preferred embodiment, the absorbent materials have a liquid absorbing capacity of more than about 1.6.

The absorbent materials of the present invention have desirably low bulk densities which promotes easy handling by consumers. It has been observed that absorbent materials having lower bulk densities are generally obtained from recycled fiber sludge having lower ash content. It is believed that this is because the particle size of ash is generally much less than that of fiber, and particles of smaller size typically form pellets having higher bulk densities.

In preferred embodiments, the present absorbent materials have a bulk density of less than about 36 lb/ft³, such as about 35, 34, 33, 32, and 31 lb/ft³. More preferably, the absorbent materials have bulk densities of less than about 30 lb/ft³, such as about 29, 28, 27, 26, 25, 24, 23, 22, 21 and 20 lb/ft³ or less.

The present absorbent materials can be used to absorb liquids, for example, liquids spilled on surfaces, such as petroleum-based liquids, including oil. The spilled liquid is absorbed by contacting the absorbent material with the liquid, for example, by depositing the absorbent material onto the spilled liquid. The absorbent material is permitted to absorb the liquid, and the wetted absorbent material can be collected for suitable disposal.

The absorbent materials of the present invention are particularly suitable for use as an animal litter. The absorbent material is placed into a litter pan and is contacted with waste from an animal, for example, a household pet, such as a cat, by the animal voiding itself into the absorbent material. The used absorbent material is easily disposed of, for example, by flushing down a toilet.

Figure 2:
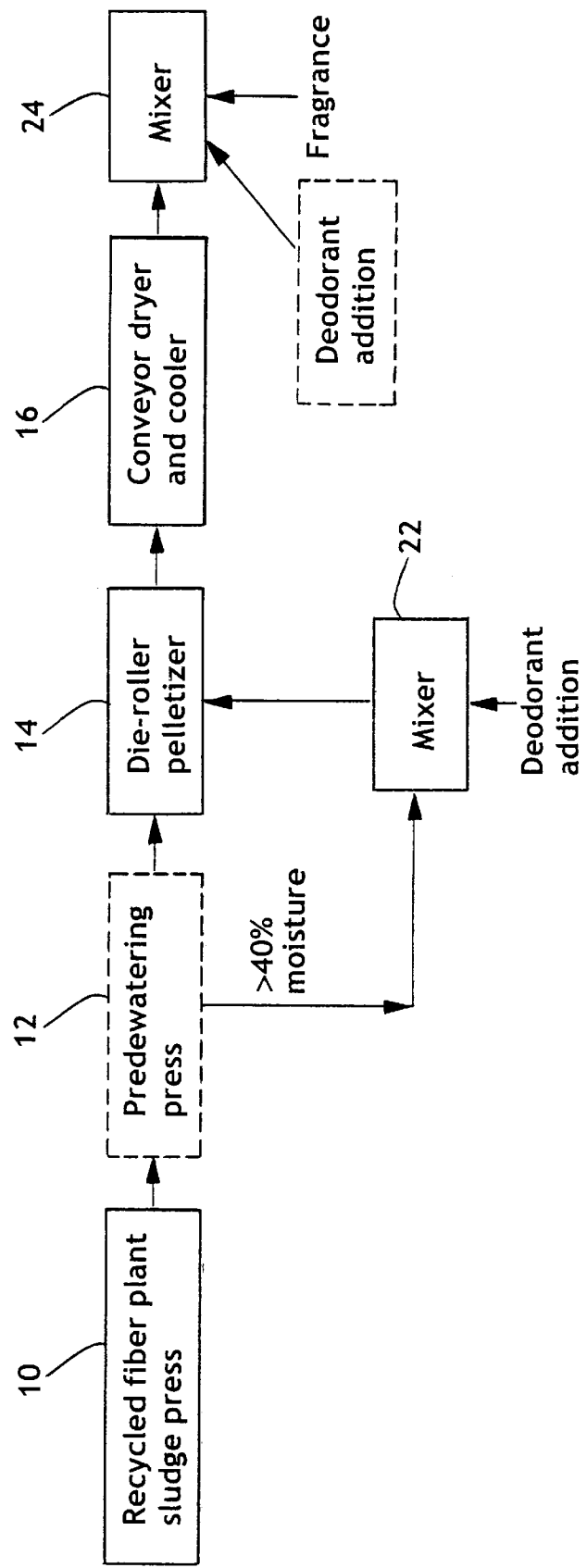
FIG. 2 is a schematic representation of an alternative process for preparing the absorbent material according to the present invention. Repeat use of reference characters in the present specification and drawings is intended to represent same or analogous features or elements of the invention.

A depiction of the presently-described process is shown in the flow charts of FIGS. 1 and 2. As shown in FIG. 1, recycled fiber sludge is typically obtained from a dewatering device in a plant, such as a recycled fiber plant sludge press 10, and then may undergo an optional dewatering process with a predewatering press 12 to obtain a recycled fiber sludge with a moisture content of greater than about 40%. This sludge is then pelletized into wet pellets by, for example, a die-roller pelletizer 14. After pellet formation, the pellets are then dried, for example, by a conveyor dryer and cooler device 16.

Alternatively, when it is desired to add deodorants and/or fragrances to the absorbent materials, the process shown in the flow chart depicted in FIG. 2 may be employed. As shown in FIG. 2, after the recycled sludge is optionally dewatered to a moisture content of greater than about 40%, the sludge may be mixed with various deodorants in mixer 22. The deodorant-containing sludge is then formed into pellets by, for example, die-roller pelletizer 14 and are then dried by conveyor dryer and cooler device 16. Various fragrances and other deodorants may optionally be added in another mixer 24.

The invention is further described in the following examples. The examples are actual examples and are for illustrative purposes only, and are not to be construed as limited the appended claims.

EXAMPLES

Examples 1 to 5 and 7 describe the preparation of pelletized absorbent materials within the scope of the present invention. Example 6 describes the preparation of pelletized absorbent materials not within the scope of the present invention. Examples 8 to 13 describe tests for evaluating the liquid absorbing capacities of the absorbent materials prepared in Examples 1 to 7, as well as prior art absorbent materials.

Examples 1 to 12 are actual examples while Example 13 is a prophetic example.

Example 1

Recycled fiber sludge from a deinking waste paper plant in the United States was used for making an absorbent material. The sludge was dewatered with a belt press to a moisture content of about 65% and analyzed as having an ash content of about 23%. The sludge was fed directly into a die-roller pelletizer and pelletized. The wet pellets were dried to less than 10% moisture using laboratory drying ovens or belt conveyor drying equipment.

Examples 2 to 6

Example 1 was repeated except that, prior to pelletizing, the sludge was dewatered to a moisture content of about 70% (Example 2); about 60% (Example 3); about 50% (Example 4); about 42% (Example 5); and about 30% (Example 6).

Example 7

The process of Example 3 was repeated except that the recycled fiber sludge was obtained from a deinking waste paper plant in Canada. The ash content of this sludge was analyzed to be about 47%.

Example 8

The pellets prepared in Examples 1 to 7 were evaluated for bulk density (lb/ft³) and water absorbing capacity (grams of water absorbed per gram of dry pellet). The results of this evaluation are set forth in Table 1.

TABLE 1

| Example | Moisture content of recycled fiber sludge (%) | Bulk Density (lb/ft³) | Ash Content (%) | Water Absorbing Capacity (g H₂O absorbed per g dry Absorbent Material) |
|---|---|---|---|---|
| 1 | 66 | 21.6 | 23 | 1.68 |
| 2 | 70 | 21.2 | 23 | 1.54 |
| 3 | 60 | 21.5 | 23 | 1.57 |
| 4 | 50 | 25.5 | 23 | 1.50 |
| 5 | 42 | 28.3 | 23 | 1.34 |
| 6 | 30 | 35.2 | 23 | 1.35 |
| 7 | 60 | 28.5 | 47 | 1.06 |

Inspection of Table 1 reveals that absorbent materials which represent preferred embodiments of the present invention (Examples 1 to 5) have lower bulk densities and improved water absorbing capacities as compared to the absorbent materials prepared in Example 6. Pellets prepared from recycled fiber sludge having a moisture content of at least 50% and higher (Examples 1 to 4) exhibit particularly improved water absorbing capacities. In addition, inspection of Table 1 indicates that the water absorbing capacity improves at ash contents of less than about 47%.

Example 9

This example is directed to an evaluation and comparison of the bulk densities and water absorbing capacities of the pellets prepared in Example 3 and two commercially available clay cat litters. The results of this evaluation are set forth in Table 2.

TABLE 2

| Absorbent Material | Bulk Density (lb/ft³) | Water Absorbing Capacity (g H₂O absorbed per g dry Absorbent Material) |
|---|---|---|
| Example 3 | 21.5 | 1.57 |
| Clay Cat Litter I | 36.6 | 0.89 |
| Clay Cat Litter II | 46.6 | 0.96 |

Inspection of Table 2 reveals that the absorbent materials of the present invention have lower bulk densities and improved water absorbing capacities compared to prior art clay cat litters.

Example 10

This example is directed to an evaluation and comparison of the bulk densities and oil absorbing capacities of the pellets prepared in Example 3, shredded waste paper and a commercially available clay absorbent. The results of this evaluation are set forth in Table 3.

TABLE 3

| Absorbent Material | Bulk Density (lb/ft³) | Oil | Oil Absorbing Capacity (g oil absorbed per g dry Absorbent Material) |
|---|---|---|---|
| Example 3 | 21.5 | Mineral Oil | 0.9 |
|  |  | 10W-40 Motor Oil | 0.9 |
| Shredded Waste Paper | 14.8 | Mineral Oil | 1.7 |
|  |  | 10W-40 Motor Oil | 1.8 |
| Clay | 36.6 | Mineral Oil | 0.5 |
|  |  | 10W-40 Motor Oil | 0.5 |

Inspection of Table 3 reveals that the absorbent materials of the present invention have bulk densities lower than prior art clay litters and improved oil absorbing capacities compared to prior art clay cat litters. Although shredded paper has a lower bulk density and a higher oil absorbing capacity than the pellets of Example 3, it is also significantly more expensive than the absorbent materials of the present invention since it utilizes a market-value product as the raw material.

Example 11

This example is directed to an evaluation of the effect of pellet size on liquid absorbing capacity. Six different sizes of pellets were made having the following dimensions, all of which are expressed in inches:

(A) a diameter of 3/32 and a length 3/16;

(B) a diameter of 3/32 and a length of 7/16;

(C) a diameter of 1/8 and a length of 3/16;

(D) a diameter of 1/8 and a length of 7/16;

(E) a diameter of 1/4 and a length of 3/16; and (F) a diameter of 1/4 and a length of 7/16.

Pellets (A) to (F) were evaluated for water absorbing capacities. The results of this evaluation are set forth in Table 4.

TABLE 4

| Pellets | Pellet Diameter (inches) | Pellet Length (inches) | Water Absorbing Capacity (g H₂O absorbed per g dry Absorbent Material) |
|---|---|---|---|
| A | 3/32 | 3/16 | 1.22 |
| B | 3/32 | 7/16 | 1.22 |
| C | 1/8 | 3/16 | 1.53 |
| D | 1/8 | 7/16 | 1.34 |
| E | 1/4 | 3/16 | 1.45 |
| F | 1/4 | 7/16 | 1.36 |

Inspection of Table 4 reveals that, for pellets having a diameter of greater than 3/32 inch, shorter pellets, and especially pellets having a length of 3/16 inch, have improved water absorbing capacities. Among the six sizes of pellets evaluated in this example, the pellets of size (C) possessed the highest water absorbing capacity.

Example 12

The absorbent materials of the present invention were distributed to households containing cats. The absorbent materials were evaluated by the cat owners for their effectiveness as a cat litter. The cat owners reported that the absorbent materials of the present invention were effective as a cat litter in that they:

(A) absorb liquid well;

(B) have substantially no tendency to stick to a cat's feet;

(C) are substantially dust free;

(D) render a litter pan easy to clean;

(E) require little or no maintenance between changes with fresh absorbent;

(F) are flushable, and therefor easily disposed;

(G) have substantially no tendency to be scattered out of the litter pan; and (H) are visually attractive to the cat owner.

The cats were also reported to be attracted to the present absorbent materials when seeking a place to void themselves of urine and/or feces.

Example 13

The evaluation conducted in Example 12 is repeated except that the absorbent materials also contain a fragrance, germicide and/or bactericide. In addition to characteristics (A) to (H) above, the absorbent material is perceived to be an effective animal litter in that it:

(I) absorbs odors;

(J) retards germ growth;

(K) renders litter pans less noticeable;

(L) has a pleasant odor; and (M) extends the time period between changes.

Various modifications of the invention, in addition to those described herein, will be apparent to those skilled in the art from the foregoing description. Such modifications are also intended to fall within the scope of the appended claims.

What is claimed is:

1. A method for preparing an absorbent material comprising:

(a) providing non-broken down and uncut recycled fiber sludge having a moisture content of greater than about 40% to about 70% by weight;

(b) pelletizing said recycled fiber sludge to form wet pellets by extruding the recycled fiber sludge through a die utilizing an extrusion force that is tangential to the surface of the die; and (c) drying said wet pellets.

2. A process according to claim 1 wherein said recycled fiber sludge has a moisture content of about 42% to less than about 70% by weight.

3. A process according to claim 2 wherein said recycled fiber sludge has a moisture content of from about 50% to about 66% by weight.

4. A process according to claim 1 comprising pelletizing said recycled fiber sludge with a die-roller pelletizer device.

5. A process according to claim 1 wherein said wet pellets remain substantially motionless relative to each other while drying.

6. A process according to claim 5 wherein comprising drying said pellets with a conveyor dryer.

7. A method for preparing an absorbent material comprising:

(a) providing recycled fiber sludge having a moisture content of greater than about 50% to less than about 70% by weight;

(b) pelletizing said recycled fiber sludge to form wet pellets by extruding the recycled fiber sludge through a die utilizing an extrusion force that is tangential to the surface of the die; and (c) drying said wet pellets.

8. A method according to claim 7 comprising providing recycled fiber sludge from a tissue-grade deinking mill.

9. A method of absorbing a liquid comprising the step of contacting the liquid with an absorbent material wherein said absorbent material is prepared by a process comprising:

(a) providing non-broken down and uncut recycled fiber sludge having a moisture content of greater than about 40% to about 70% by weight;

(b) pelletizing said recycled fiber sludge to form wet pellets by extruding the recycled fiber sludge through a die utilizing an extrusion force that is tangential to the surface of the die; and (c) drying said wet pellets.

10. A method according to claim 9 wherein said liquid is selected from the group consisting of solvents, aqueous liquids and petroleum-based liquids.

11. A method according to claim 10 wherein said aqueous liquid comprises an animal waste liquid.

12. A method according to claim 11 wherein said animal waste liquid comprises urine.

13. A method according to claim 10 wherein said petroleum-based liquid comprises oil or grease.

* * * * *